Nov. 13, 1928.
H. E. KEMPTON ET AL
1,691,657
CHUCK
Original Filed June 20, 1924
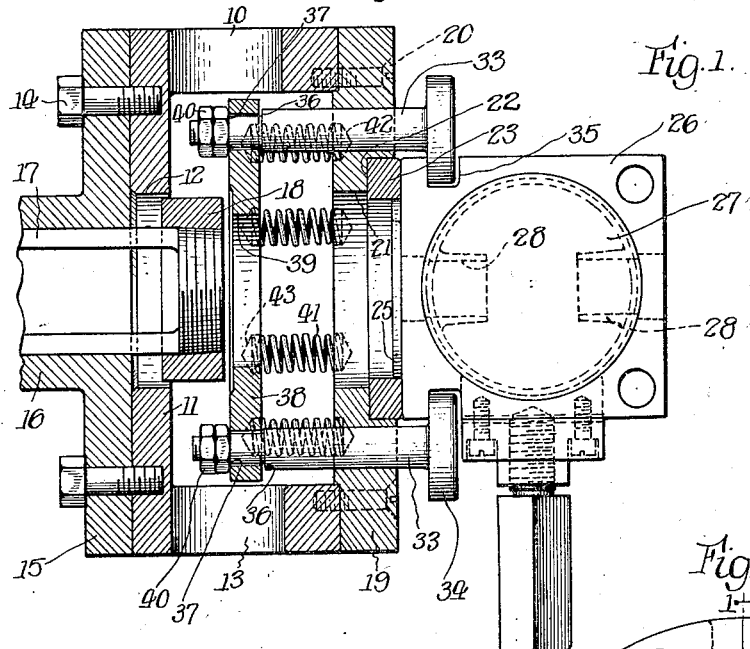
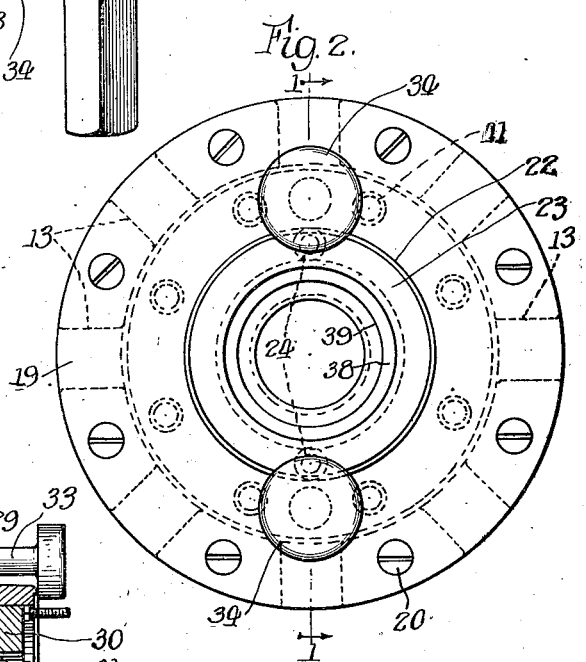
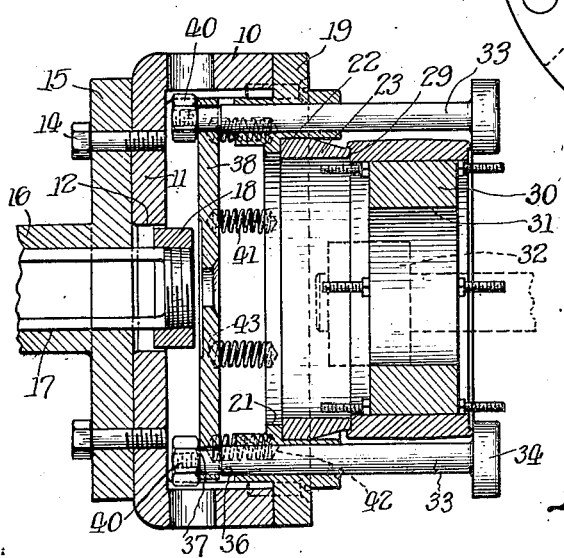
Inventors:
Herbert E. Kempton,
Keith F. Gallimore,
Raymond M. Woytych, Patented Nov. 13, 1928.

1,691,657

UNITED STATES PATENT OFFICE.

HERBERT E. KEMPTON, OF CHICAGO, ILLINOIS, AND KEITH F. GALLIMORE AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS.

CHUCK.

Application filed June 20, 1924, Serial No. 721,172. Renewed September 21, 1928.

Our invention relates to improvements in chucks, and has particular reference to chucks of the general type in which the part being chucked is clamped in a centered position by a plurality of spring-pressed members.

The primary object of our invention is to provide a work holding chuck which is simple, sturdy and short in construction; easy and quick to load and unload; and designed to resiliently clamp the part being chucked firmly and accurately in a centered position against the outer face of the front plate, thereby adapting the chuck to handle special parts, such as portable work shuttles, large and irregular in shape.

Further objects and advantages will become apparent as the description proceeds.

In the drawings,

Figure 1 is a sectional view taken in the plane of line 1—1 of Fig. 2 of a chuck embodying the features of our invention, with a work shuttle shown in elevation clamped against the front face in true centered relation to the axis of rotation.

Fig. 2 is a front view of the chuck with the shuttle removed.

Fig. 3 is a sectional view similar to Fig. 1 of a slightly modified form of chuck with a work piece of irregular shape clamped in centered position.

While we have shown in the drawings and will herein describe in detail the preferred embodiment of our invention, it is to be understood that we do not thereby intend to limit the same to the construction disclosed, but aim in the appended claims to cover all modifications and alternative constructions falling within the spirit and scope of the invention.

Referring to the drawings, 10 represents the body of the chuck which in the present instance is hollow and cylindrical in form, and is closed at its rear end by a radial flange 11 defining a concentric axial opening 12. A plurality of spaced clearance openings 13 extend through the cylindrical wall of the body 10, and serve to conduct away any abrasive particles, dust, coolant, or other refuse thrown off in the machine operation into the chuck. To support the chuck for axial rotation the flange 11 is rigidly secured by bolts 14 to a circular flange plate 15 formed on the front end of a rotatable work spindle 16. Extending through the spindle 16 and into the chuck body 10 is a floating push bar 17 having a nut 18 threaded onto its forward end.

The front end of the body 10 is closed by a circular face plate 19 held in place by a plurality of screws 20, and having a central axial opening 21. Mounted in an annular notch 22 formed in the plate 19 at the front edge of the opening 21 is a hardened centering bushing 23 which is secured in place by screws 24. As shown in Fig. 1, the bushing 23 is adapted to receive an annular centering pilot 25 formed on a work shuttle 26. In the present instance, the shuttle 26 when clamped against the bushing 23 is designed to support an engine piston 27 with its wrist-pin holes 28 in true centered relation to the chuck. The shuttle 26 disclosed in Fig. 1 is not our invention but is the invention of Gallimore and Woytych and is claimed in a copending application Serial No. 728,116 filed July 25, 1924. In Fig. 3 the centering bushing 23 is designed to engage an annular notch 29 which is suitably formed in one end of any desired work blank 30, such as an armature core for motors, and is concentric with the bore 31 of the blank to be internally ground by a grinding element 32.

Slidably extending through the face plate 19 are a plurality of clamping members or pins 33 having enlarged circular heads 34 on their outer ends adapted to engage the part being chucked to clamp it against the bushing 23. Herein we have shown a pair of diametrically opposed pins 33 which are shown in Fig. 1 as engaging grooves 35 in the upper and lower sides of the shuttle 26, and in Fig. 3 as fitting over the outer end of the work blank 30. The inner ends of the pins 33 are each reduced in size to provide successive annular spaced shoulders 36 and 37. A circular disk 38 having a central opening 39 is mounted on the pins 33 between the shoulders 36 and 37, and is retained thereon by nuts 40 threaded against the shoulders 37. The shoulders 36 and 37 of each set are spaced apart sufficiently to provide a limited lost motion connection of the disk 38 with the pins 33, thereby allowing the latter a limited independent relative movement to compensate for unevenness in the thickness of the part being chucked.

A plurality of parallel spaced coil springs 41, preferably located uniformly about the axis of the chuck, engage respectively at their opposite ends in depressions 42 formed in the face plate 19 and depressions 43 formed in the front side of the disk 38, and serve to move the pins 33 rearwardly into resilient engagement with the part being chucked. The pins 33 can be moved forwardly against the action of the springs 41 to release the part by forcing the nut 18 on the floating push bar 17 against the rear surface of the disk 38.

It will be seen that the part to be chucked can be quickly placed in a centered position, and can then be clamped in place by releasing the bar 17. The chuck is extremely simple in construction, and can be adapted to handle parts of many different kinds, sizes, or shapes. Since the blanks are clamped against the front face of the bushing 23, the chuck can be made short, thereby saving space.

We claim as our invention:

1. A chuck comprising, in combination, a hollow cylindrical body substantially closed at the rear end, a circular face plate closing the front end of said body, a centering bushing in said face plate, a pair of clamping members slidably extending through said face plate at opposite sides of said bushing, said members having enlarged disk shaped outer ends, a disk positioned in said body and mounted on the inner ends of said members, said disk having a lost motion connection with each of said members, a plurality of spaced springs respectively engaging at their opposite ends with said face plate and said disk to move the outer ends of said members rearwardly toward said bushing, and means positioned to engage said disk to move said members forwardly.

2. A chuck having, in combination, a body, a face plate secured to the front of said body, a bushing centrally mounted in said face plate, a plurality of clamping members slidably extending through said face plate, a disk positioned within said body and having a lost motion connection with each of said members, a plurality of springs engaging said disk, said springs tending to move the latter rearwardly, and means within said body for moving said disk forwardly.

3. A chuck having, in combination, a body, a face plate, a plurality of clamping members extending through said face plate, a disk having a lost motion connection with said members permitting a limited independent movement of each member, spring means for moving said members in one direction into clamping engagement with the work, and means for engaging said disk to move said members in the other direction.

4. A chuck having, in combination, a body, a face plate, a pair of clamping members located in said body and extending through said face plate at diametrically opposite points, a disk through which the rear ends of said clamping members extend, said clamping members being loosely fastened to said disk whereby to allow limited independent longitudinal movement thereof and resulting in allowing rotative movement of said clamping members, means to move said disk to actuate said clamping members, and a disk shaped enlargement on the front of each clamping member outside said face plate, whereby an article to be held by said chuck can be placed in position sideways and said clamping members retracted to hold it, the exact angular position of said clamping members being immaterial.

In testimony whereof we have hereunto affixed our signatures.

HERBERT E. KEMPTON.
KEITH F. GALLIMORE.
RAYMOND M. WOYTYCH